(12) United States Patent
Miyamura et al.

(10) Patent No.: US 11,635,914 B2
(45) Date of Patent: Apr. 25, 2023

(54) LOCATING DATA WITHIN TAPE SYSTEMS USING SUB DATASET HEADERS

(71) Applicant: International Business Machines Corporation, Armonk, NY (US)

(72) Inventors: Tsuyoshi Miyamura, Yokohama (JP); Setsuko Masuda, Tokyo (JP); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 16/942,959

(22) Filed: Jul. 30, 2020

(65) Prior Publication Data

US 2022/0035563 A1 Feb. 3, 2022

(51) Int. Cl.
*G06F 3/06* (2006.01)
*G11B 27/10* (2006.01)
*G11B 15/087* (2006.01)
*G11B 27/34* (2006.01)
*G11B 5/008* (2006.01)

(52) U.S. Cl.
CPC .......... *G06F 3/0659* (2013.01); *G06F 3/0604* (2013.01); *G06F 3/0682* (2013.01); *G11B 5/00813* (2013.01); *G11B 15/087* (2013.01); *G11B 27/107* (2013.01); *G11B 27/34* (2013.01)

(58) Field of Classification Search
CPC .... G06F 3/0659; G06F 3/0604; G06F 3/0682; G11B 5/00813; G11B 5/087; G11B 27/107; G11B 27/34; G11B 15/087
See application file for complete search history.

(56) References Cited

U.S. PATENT DOCUMENTS

| 5,485,321 | A * | 1/1996 | Leonhardt | G11B 27/323 |
| 6,307,700 | B1 * | 10/2001 | Takayama | G11B 27/3027 360/72.2 |
| 7,535,664 | B1 | 5/2009 | Gill | |
| 9,612,905 | B2 | 4/2017 | Cideciyan et al. | |
| 10,229,718 | B1 * | 3/2019 | Hasegawa | G11B 27/107 |
| 10,541,004 | B2 | 1/2020 | Hasegawa et al. | |
| 2006/0098324 | A1 | 5/2006 | Goker et al. | |
| 2012/0036318 | A1 * | 2/2012 | Cideciyan | G06F 3/0619 711/111 |

(Continued)

FOREIGN PATENT DOCUMENTS

| JP | 04505982 A | 10/1992 |
| JP | 05500878 A | 2/1993 |

(Continued)

OTHER PUBLICATIONS

IBM, "Double Tape Recording Techniques (Data Security Mode, Performance Mode)", An IP.com Prior Art Database Technical Disclosure, Original Publication Date: Mar. 1, 2000, IP.com No. IPCOM000014345D, IP.com Electronic Publication Date: Jun. 19, 2003, 4 pages.

*Primary Examiner* — Kalpit Parikh
(74) *Attorney, Agent, or Firm* — James J. Olsen

(57) ABSTRACT

Aspects of the present disclosure relate to a method of writing a dataset to a tape, the dataset comprising a plurality of sub datasets, each sub dataset including a plurality of headers and a plurality of records. The method includes storing, in each header of each sub dataset, at least a portion of a record range indicator indicating a range of records included in the dataset.

20 Claims, 7 Drawing Sheets

(56) References Cited

U.S. PATENT DOCUMENTS

2012/0170147 A1    7/2012  Hutchon et al.
2014/0063634 A1*   3/2014  Butt ..................... G06F 3/0638
                                                      360/48

FOREIGN PATENT DOCUMENTS

| JP | 2000259743 A | 9/2000 |
| JP | 2002520730 A | 7/2002 |
| JP | 2004501449 A | 1/2004 |

* cited by examiner

LOCATING DATA WITHIN TAPE SYSTEMS USING SUB DATASET HEADERS

BACKGROUND

The present disclosure relates generally to the field of tape systems, and more particularly to locating data within tape systems.

Magnetic tape systems store digital information on magnetic tape. Magnetic tapes can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to a system, computer program product, and method for writing a dataset to a tape, the dataset comprising a plurality of sub datasets, each sub dataset including a plurality of headers and a plurality of records. The method includes storing, in each header of each sub dataset, at least a portion of a record range indicator indicating a range of records included in the dataset.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
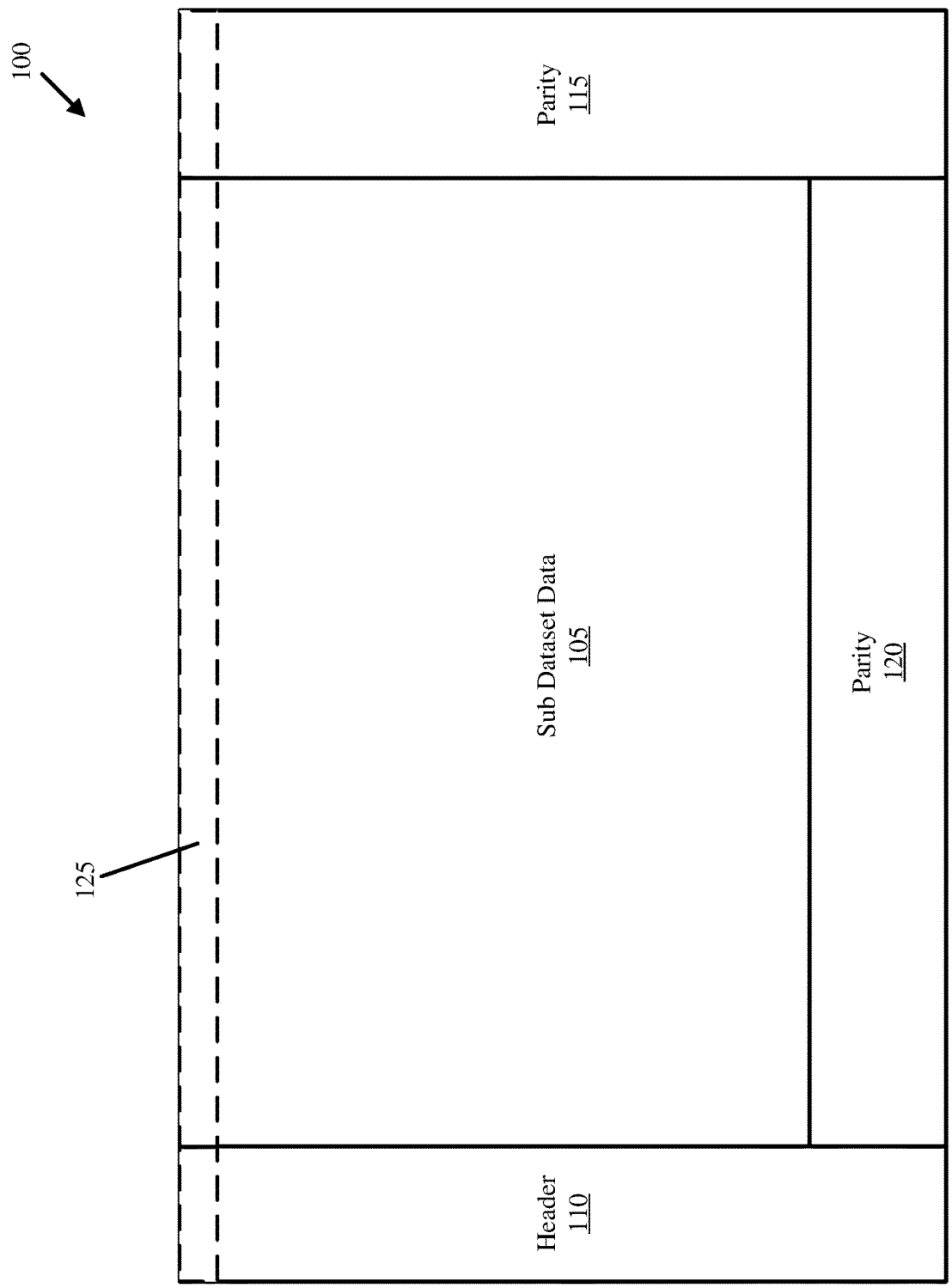
FIG. 1 is a block diagram illustrating an example sub dataset, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape storage, and more particularly to locating data within tape systems. While the present disclosure is not necessarily limited to such applications, various aspects of the disclosure may be appreciated through a discussion of various examples using this context.

Repositioning is a process in which a tape is wound to a target data position such that data can be read from the tape starting at the target data position. In order for the tape to be repositioned to the target data position, a request to reposition is made with a record number or file marker (a partition of a file composed of many records) number indicating where the tape should be repositioned. The tape system then references a tape directory to find the target record and/or file marker (target data position). The tape directory utilizes a physical mapping of areas on the tape to record/file marker numbers to reposition the tape to the correct physical area on the tape. For example, a tape can have 272 wraps and each wrap can have 128 areas (or 34,816 total areas on the tape). Each area can be associated with a last record number and/or file marker number. In response to a reposition request, the area including the target record number or file marker can be identified as the physical location for repositioning. Upon repositioning to the correct area, datasets within the area are read sequentially from the beginning until the target record or file marker is found. If the target record or file marker is found, then repositioning ends. However, if the target record or file marker is not found, the remaining area is continued to be read until the target record or file marker is found.

In some instances, if a target dataset cannot be read, the tape drive may repeatedly re-read the same dataset to attempt to find the record and filemark range of the dataset. This process is known as an error recovery procedure (ERP). This can occur if the condition of the tape and/or tape head are worn from repeated use or debris. A single ERP re-read on a dataset can take approximately 3-5 seconds. However, not being able to locate a target data position is a critical issue, and as a result, the tape drive can repeat the ERP re-read 80 or more times to attempt to find the target data position. If the target position cannot be found, the ERP will eventually return an error, or alternatively, the command will time out on the host side. Accordingly, complications exist where target data positions cannot be accurately located. Additionally, issues exist where error recovery procedures run for prolonged periods (e.g., over 20 minutes) to attempt locate the target data position.

Aspects of the present disclosure address the aforementioned complications by storing target data position data (e.g., record number ranges and file marker ranges) in headers of sub datasets associated with a tape system. In response to receiving a reposition request, a tape directory can be referenced to identify the physical area on the tape including the target data position. Upon repositioning to the correct physical area of the tape, headers of sub datasets can be referenced during a skimming process to quickly and accurately locate the target data position.

Aspects of the present disclosure provide several advantages. First, reliability of the tape system increases, as fewer errors locating data will occur as a result of target data positions being located in headers of sub datasets. Additionally, less time locating data may be spent, as fewer ERP reads may be required. Additionally, availability of computing resources such as bandwidth and processor utilization can increase as a result of less time spent running ERP reads.

Data is written from a host to the tape drive in units of records. Records written from the host are encrypted and compressed into sub datasets before being written onto a buffer mounted on the tape drive.

Referring now to FIG. 1, shown is a sub dataset 100 structure, in accordance with embodiments of the present disclosure. The sub dataset 100 includes sub dataset data 105, a header portion 110, a first parity 115, and a second parity 120.

The sub dataset data 105 can include one or more records including data (in a compressed/encrypted form). Multiple sub datasets can collectively make up a dataset. Accordingly, sub dataset data from respective sub datasets make up the data of a dataset. The tape drive writes/reads data to the tape in datasets. The header portion 110 can include metadata describing information of the sub dataset 100. The first parity 115 and second parity 120 contain error correcting code (ECC) corresponding to the sub dataset data 105. This can allow the data of the sub dataset data 105 to be corrected if any corruptions or errors are associated with the sub dataset data 105.

The sub dataset 100 can be any suitable size. In embodiments, the sub dataset is logically organized into a two-dimensional array. As an example, the sub dataset data 105 may contain 912 bytes horizontally and 168 bytes vertically (912×168 bytes), the header portion 110 may contain 12 bytes horizontally and 192 bytes vertically (12×192 bytes), the first parity 115 may contain 48 bytes horizontally and 192 bytes vertically (48×192 bytes), and the second parity 120 may contain 912 bytes horizontally and 24 bytes vertically (912×24 bytes), amounting to a 972×192 byte sub dataset. However, any suitable size or structure of sub dataset 100 can be implemented.

Each row of the two-dimensional array (e.g., 972 bytes horizontally) that makes up the sub dataset 100 is referred to as a 4-way codeword interleave (CWI-4) 125. Each CWI-4 can include 12 bytes from header portion 110, 912 bytes from sub dataset data 105, and 48 bytes from the first parity 115. Thus, each sub dataset 100 can include 192 CWI-4's, each with a respective header (e.g., the header portion 110 is broken down into 192 12 byte headers for each CWI-4). In tape systems, CWI-4 rows can be written from tape heads in parallel.

Figure 2:
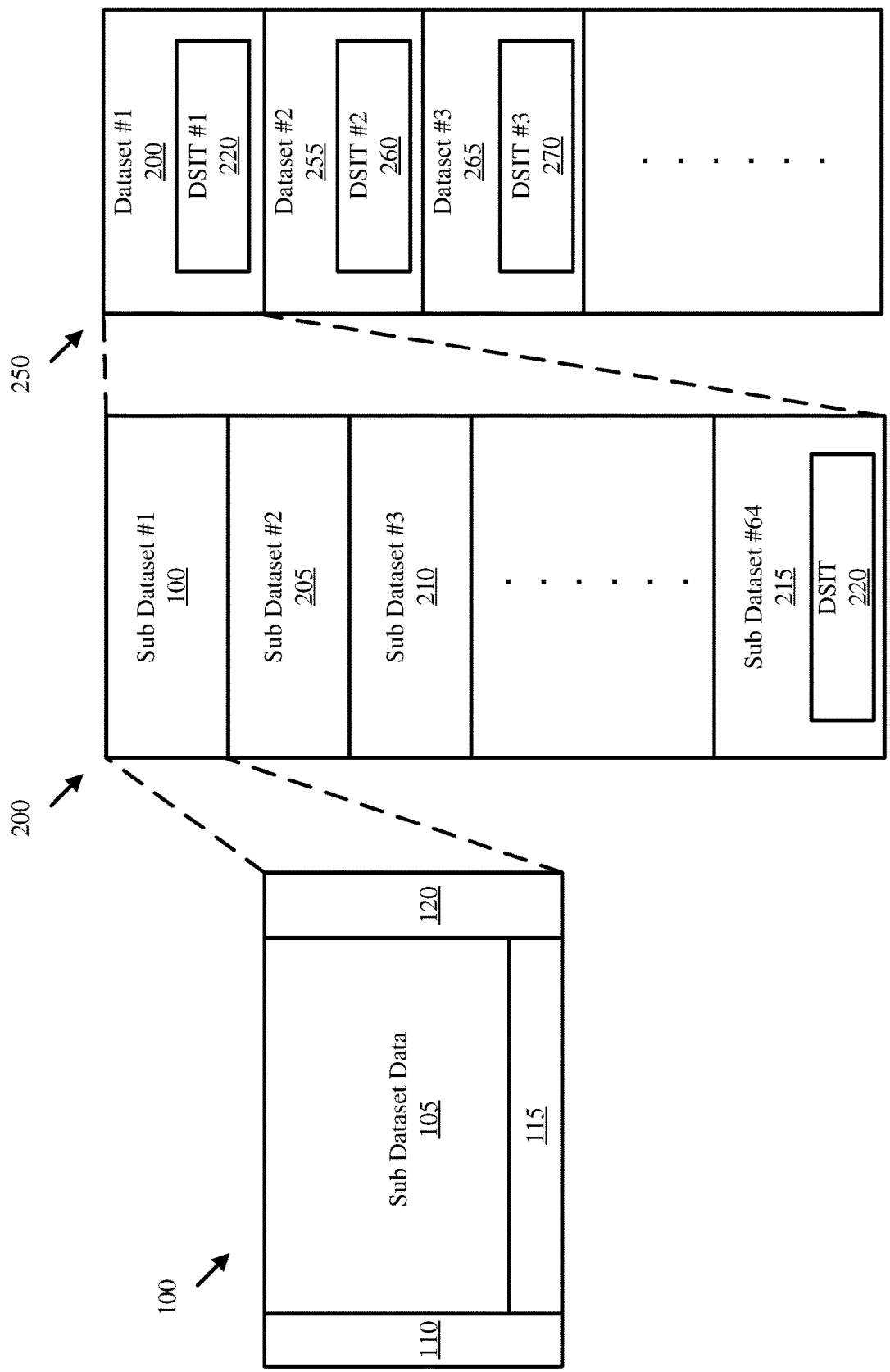
FIG. 2 is a block diagram illustrating example data structures within a tape system, in accordance with embodiments of the present disclosure.

Referring now to FIG. 2, shown is a diagram depicting various data structures of a tape system, in accordance with embodiments of the present disclosure. A dataset 200 is comprised of multiple sub datasets. For example, as depicted in FIG. 2, dataset 200 includes the sub dataset 100 (sub dataset #1), a second sub dataset 205, a third sub dataset 210, and so on up to a 64$^{th}$ sub dataset 215. As such, in the example depicted in FIG. 2, the dataset 200 includes 64 sub datasets.

The last CWI-4 (sub dataset row) of each dataset includes a dataset information table (DSIT) 220. Various information relating to the dataset 200 is recorded in the DSIT 220. For example, the DSIT 220 can include the range of record numbers and file markers included in the dataset. This can be used during a repositioning request such that when an area of the tape including a target data position is identified, DSIT information from each dataset can be read to ascertain the presence of the target data position by referencing the record and file marker ranges indicated in the DSIT.

A ring buffer 250 can comprise multiple datasets. For example, as depicted in FIG. 2, ring buffer 250 includes at least dataset 200, a second dataset 255, and a third dataset 265. Each dataset has a corresponding DSIT. As shown in FIG. 2, the second dataset 255 includes a second DSIT 260 including metadata information about the second dataset 255 and the third dataset 265 includes a third DSIT 270 including metadata information about the third dataset 265.

Though DSIT data can be used to ascertain the presence of a target data position within a given dataset, the DSIT data may not always be readable. This can occur if the condition of the tape and/or tape head are worn from repeated use or debris. As such, relying solely on the DSIT information to ascertain the presence of a target data position within a dataset may be unreliable, as each dataset only includes a single DSIT and the DSIT may not be readable. As such, aspects of the present disclosure can include information such as the record range and file marker range in each header of each CWI-4. This provides an additional mechanism to ascertain the presence of a target data location in a given position on a tape.

In embodiments, each CWI-4 of each sub dataset includes record range and/or file marker indicators. In some embodiments, a subset of CWI-4 (e.g., every other CWI-4, every ten CWI-4's, the first half of the rows within the sub dataset array, etc.) headers include record range and/or file marker indicators. In some embodiments, a record range and/or file marker indicator can be distributed among multiple CWI-4 headers (e.g., requiring the reading of multiple headers to ascertain the record range and/or file marker indicator).

Figure 3:
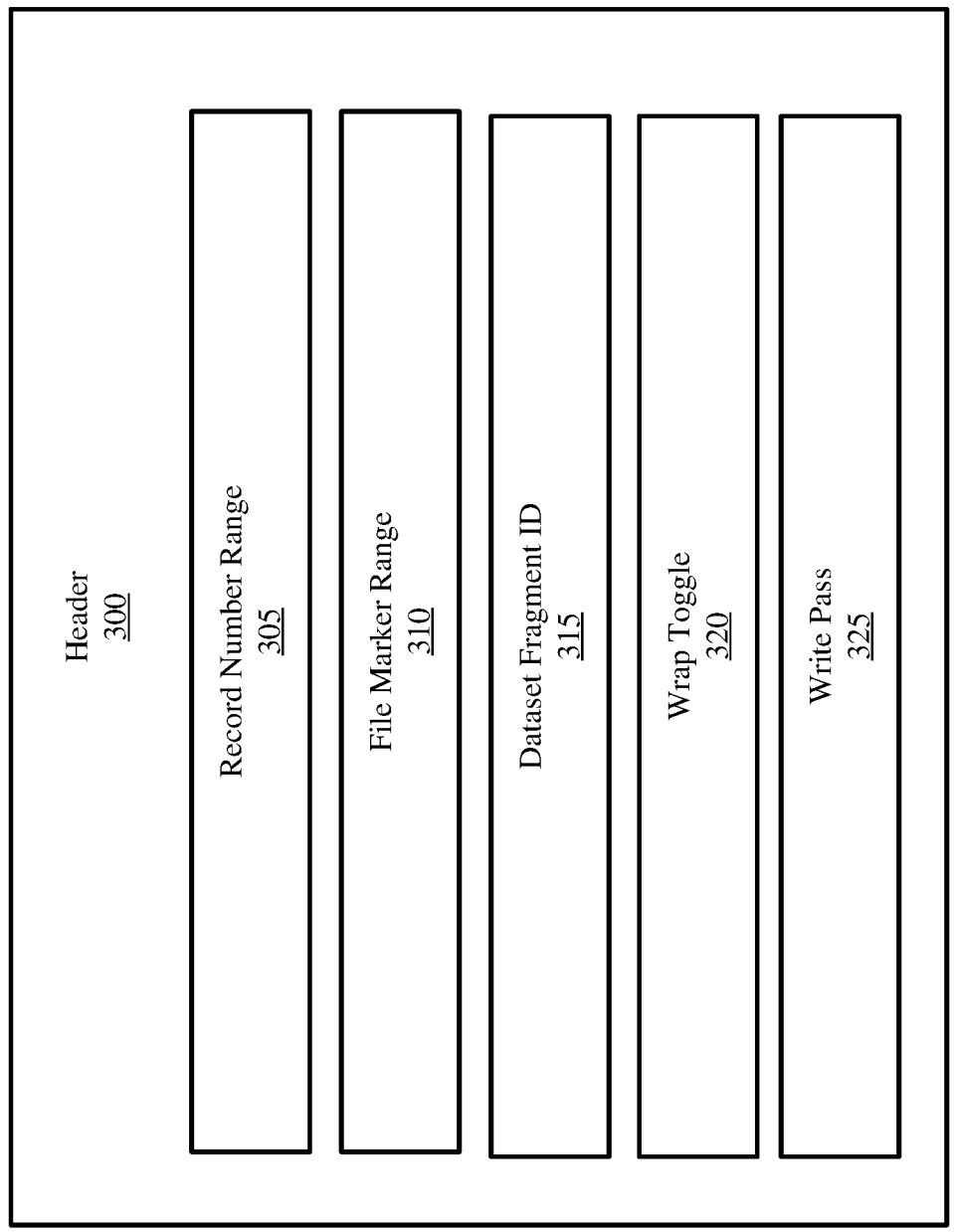
FIG. 3 is a block diagram illustrating an example header, in accordance with embodiments of the present disclosure.

Referring now to FIG. 3, shown is an example header 300 of a sub dataset (not shown), in accordance with embodiments of the present disclosure. The header 300 can, in some embodiments, be a 12 byte portion of a CWI-4 of a sub dataset (e.g., the portion of header 110 within CWI-4 125 of sub dataset 100 of FIG. 1).

As depicted in FIG. 3, the header 300 includes a record number range 305, a file marker range 310, a dataset fragment ID 315, a wrap toggle 320, and a write pass 325. The record number range 305 includes an indicator specifying the record range stored within the sub dataset. For example, if records 500-505 are stored within the sub dataset, then the record number range 305 could indicate "Record Number Range: 500-505." However, in some embodiments, the record number range 305 may only include the beginning or end record of the sub dataset, as the range could still be ascertained based on the beginning or end record indicated in a subsequent or preceding sub dataset header. The file marker range 310 can include an indicator specifying the file marker range stored within the sub dataset. For example, if file markers 799-823 are stored within a given sub dataset, then the file marker range 310 could indicate "File Marker Range: 799-823." Similar to the record number range, the beginning or end file marker could be stored as opposed to the range.

In some embodiments, the record number range 305 and/or file marker range 310 can be distributed across multiple headers (not shown) of respective CWI-4s. This can reduce the amount of data needed to be stored within the header 300, which may have a limited capacity (e.g., 12 bytes). For example, record number range 305 can be distributed among four headers of four respective CWI-4s. As an example, if record number is expressed by 4 bytes, 1 byte can be stored in a first header of a first CWI-4, 1 byte can be stored in a second header of a second CWI-4, 1 byte can be stored in a third header of a third CWI-4, and 1 byte can be stored in a fourth header of a fourth CWI-4. Thus, collectively reading the first through fourth CWI-4 provides the record number range 305 for the dataset to which the four CWI-4's belong.

Dataset fragment ID 315 can indicate the dataset number. In embodiments, because the size of the header may be limited, only the last several bits of the dataset number may be recorded in the header 300. Wrap toggle 320 can indicate the wrap number in which the dataset is recorded. In embodiments, because the size of the header 300 may be limited, only the last several bits of the wrap number may be recorded in the header 300. Write pass 325 can indicate an integer that increases sequentially when data is written to a tape. For example, the write pass 325 can be incremented by 1 when overwriting an old dataset or when writing to a new wrap. As such, the write pass 325 can be used to determine the recency of the sub dataset compared to other data within the tape.

Figure 4:
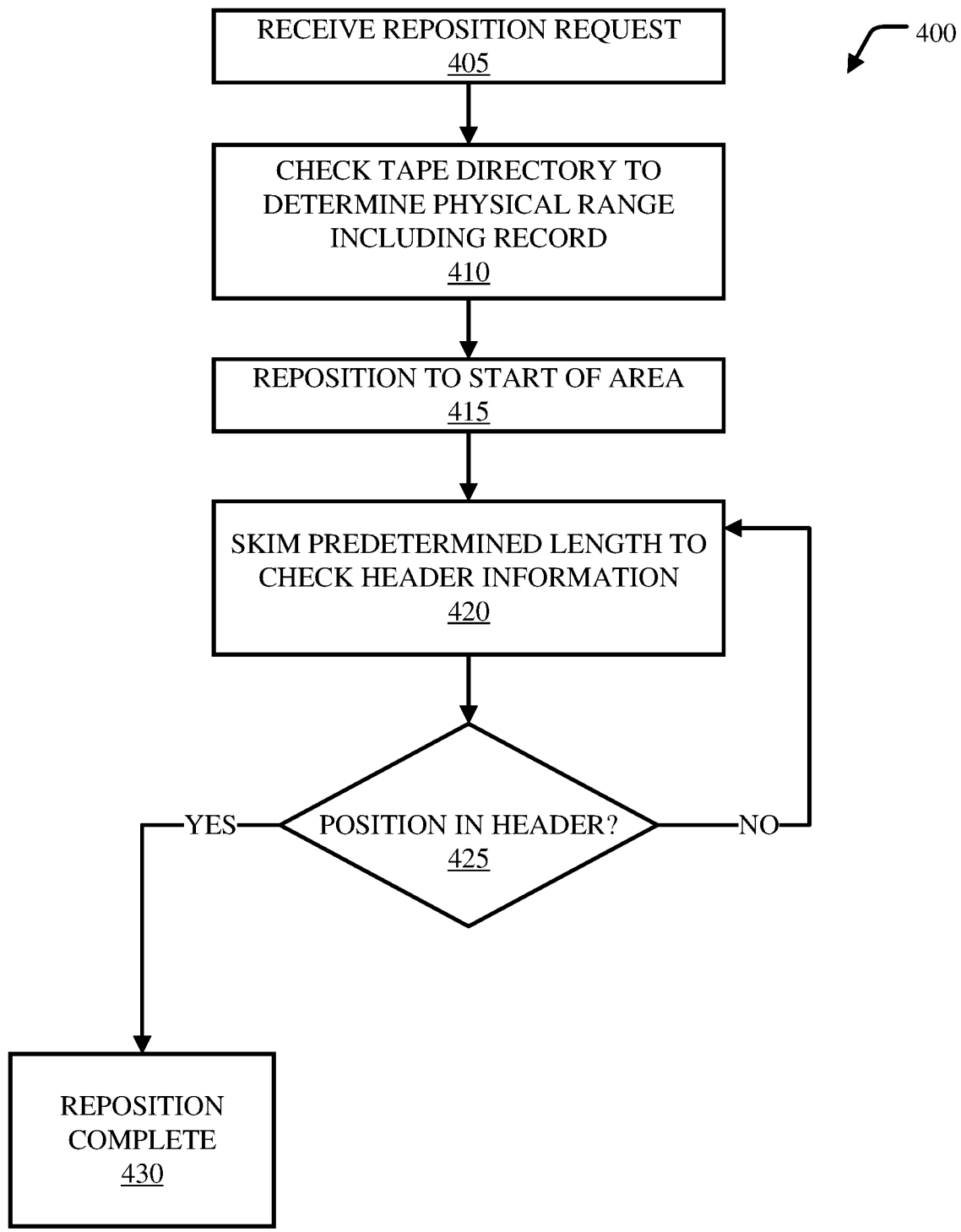
FIG. 4 is a flow diagram illustrating an example method for repositioning a tape to a target data position using header information, in accordance with embodiments of the present disclosure.

Referring now to FIG. 4, shown is an example method 400 for repositioning a tape using header information stored in sub datasets, in accordance with embodiments of the present disclosure.

Method 400 initiates at operation 405, where a reposition request is received. The reposition request can be received from a host coupled to a tape system (e.g., a linear file tape system (LFTS)) where the tape is mounted. The reposition request can indicate a target data position (e.g., a record number or file marker number) where the tape will be repositioned. For example, the reposition request can indicate "Reposition to: Record 5000" or "Reposition to: File Marker 100."

Figure 5:
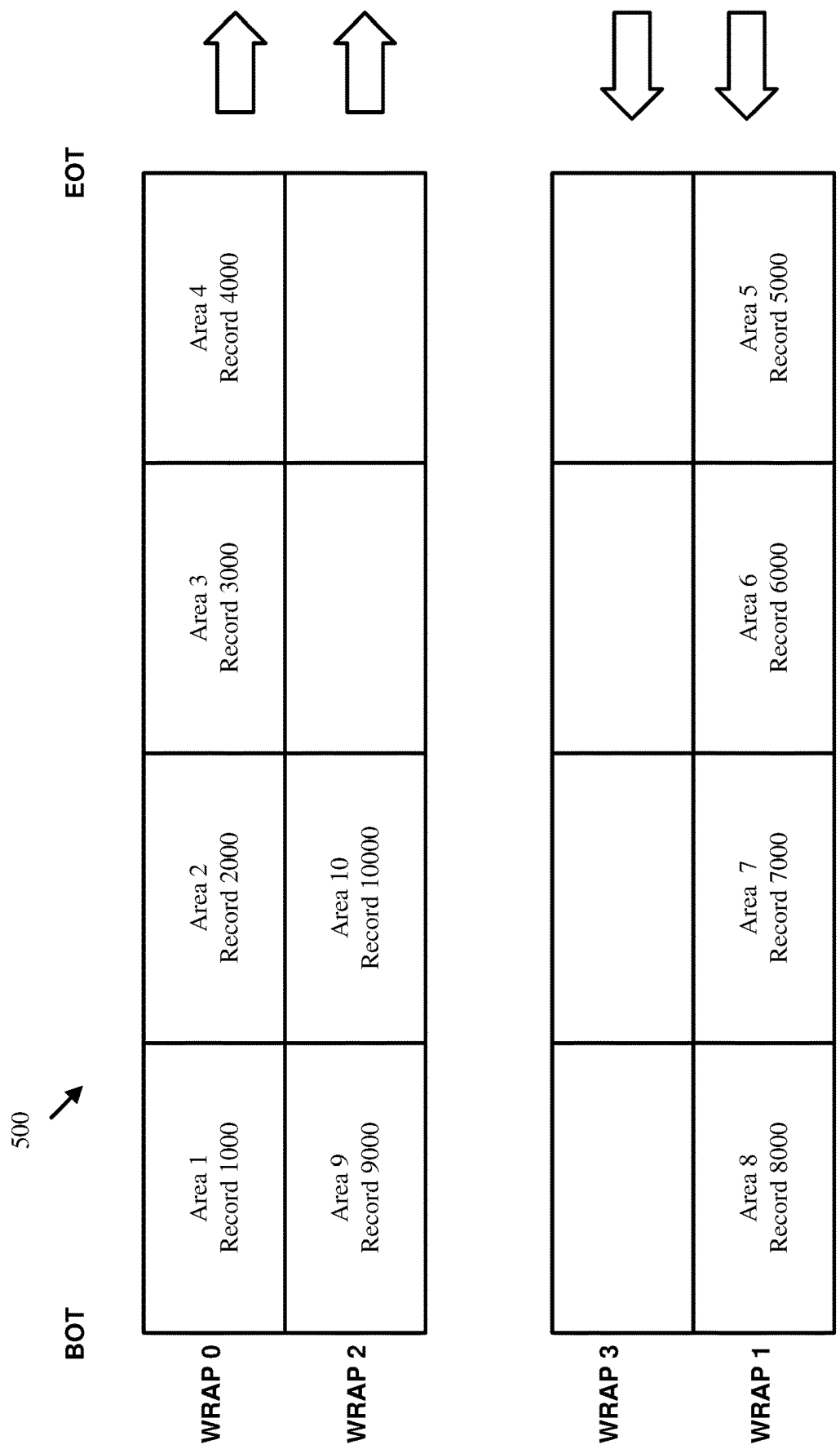
FIG. 5 is a block diagram illustrating an example tape directory, in accordance with embodiments of the present disclosure.

Upon receiving the reposition request, a tape directory is referenced to determine the physical range of the tape including the record. This is illustrated at operation 410. The tape directory is a mapping of target data positions to physical areas on the tape. The tape directory is updated upon any write processing. Thus, the tape directory contains the most recent mappings prior to receiving any repositioning request. As an example, a tape can be broken down into 272 physical wraps, each of which can be broken down further into 128 areas per wrap. Each area can be mapped to a corresponding record or file marker range within the tape directory. Thus, in response to receiving the repositioning request at operation 405, the tape directory is referenced and the area including the record or file marker indicated in the repositioning request is determined. An example tape directory 500 is depicted in FIG. 5.

The tape is repositioned to the start of the area. This is illustrated at operation 415. For example, if "Area 10" is determined to include a target record, "Record 4000," and the Area 10 includes datasets "Dataset 125-130," then the tape can be repositioned to Area 10 and reading can begin at Dataset 125. The repositioning at operation 415 can be completed at relatively high speeds (e.g., 15 m/s), as only positional information is referenced on the tape.

A predetermined length is then skimmed to check header information of sub datasets within the predetermined length. This is illustrated at operation 420. Any suitable length within the area can be skimmed. For example, a certain number of datasets (e.g., 4 datasets), sub datasets (e.g., 500 sub datasets), or a physical length (e.g., 5 meters) of the tape area can be skimmed. As referenced herein, "skimming" refers to the process of reading header information stored within CWI-4s of sub datasets to ascertain the presence of a target data position. In embodiments, each sub dataset can contain 192 CWI-4's. Thus, 192 headers can be skimmed per sub dataset. In embodiments, the target data position may be collectively stored across multiple CWI-4's. For example, a record range indicator or file marker range indicator can be evenly distributed across 12 CWI-4's. Thus, identifying the target data position can include reading multiple headers storing portions of target data position indicators.

At this point, reading is performed at relatively slower speeds (e.g., 5 m/s). Thus, to save time, partitions of the area can be skimmed rather than the full length of the area indicated in the tape directory. However, in some embodiments, the full area can be skimmed.

A determination is made whether the target data position is found within a header of a sub dataset. This is illustrated at operation 425. The determination as to whether the target data position is found within the header of a sub dataset can be completed by inspecting record number and/or file marker ranges within the header and comparing the record number and/or file marker ranges to the target position indicated in the reposition request. If the target position falls within the range, then a determination is made that the target data position is found.

If the target data position is found in the header (e.g., the range in the header includes the target data position), then the reposition is complete, as the tape has been properly wound to the correct data position indicated in the reposition request. This is illustrated at operation 430. If the target data position is not found in the header, then method 400 returns to operation 420, where additional skimming to check header information is performed. This can be completed until the target data position is found within the area.

In embodiments, the full area can be skimmed until the target data position is found. In embodiments, if the full area is skimmed and the target data position is not found, the area can be reskimmed until the target data position is found. In embodiments, a particular number of skims (of the full area or partitions of the area) can be permitted prior to recording an error and outputting a failure indication to the host. Alternatively, a warning can be transmitted to the host after a particular time period has elapsed (e.g., a timeout).

The aforementioned operations can be completed in any order and are not limited to those described. Additionally, some, all, or none of the aforementioned operations can be completed, while still remaining within the spirit and scope of the present disclosure.

Referring now to FIG. 5, shown is an example tape directory 500, in accordance with embodiments of the present disclosure. As depicted in FIG. 5, the tape directory 500 includes four wraps, each wrap including four areas. The abbreviations "BOT" and "EOT" depicted in FIG. 5 indicate the beginning of the tape and the end of the tape, respectively. Arrows depict the direction that reading occurs for each respective wrap (e.g., reading wraps 0 and 2 occurs from left to right while reading wraps 1 and 3 occurs from right to left).

In this example, each area includes a record identifier (e.g., Records 1000-10000) depicting the last recorded record within the area. Thus, Area 1 includes records 0-1000, Area 2 includes records 1001-2000, Area 3 includes records 2001-3000, etc. In this example, if a reposition request is made for record 4500, then the tape directory 500 would indicate that this record is located in Area 5 of Wrap 1 (e.g., including records 4001-5000). Thus, in response to the reposition request, the tape is wound to the beginning of Area 5 and skimming can occur at a predetermined length within Area 5. For example, skimming could occur at the first dataset within Area 5. However, skimming does not necessarily have to occur at the beginning of the area. For example, if Area 5 includes 10 datasets, skimming could begin at the $5^{th}$ dataset within Area 5.

Figure 6:
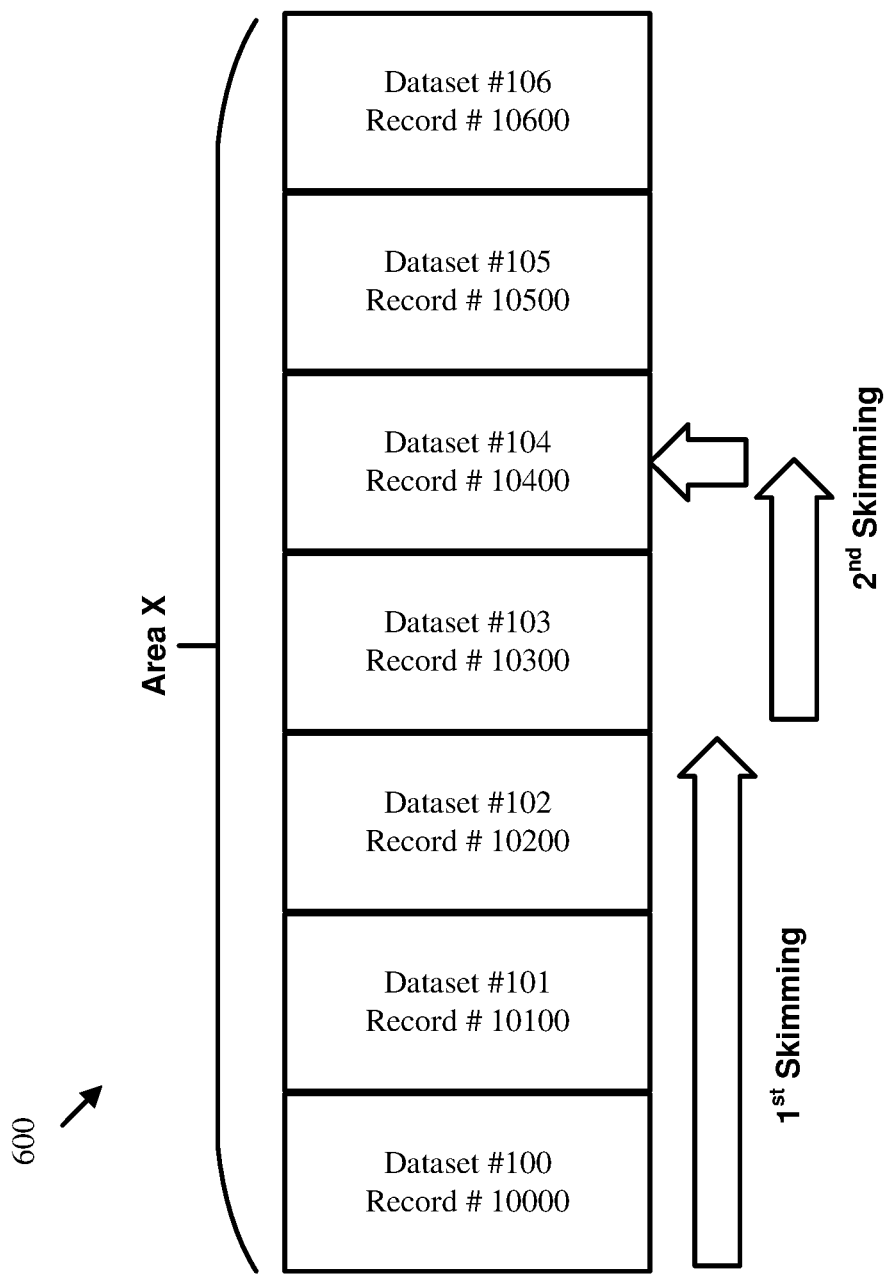
FIG. 6 is a block diagram depicting the skimming of header information to locate a target record, in accordance with embodiments of the present disclosure.

Referring now to FIG. 6, shown is an example skimming that occurs within a given area 600, "Area X," of a tape based on information extracted from headers of datasets, in accordance with embodiments of the present disclosure. Assume that a reposition request indicates repositioning to a target record, "Record 10,350."

As depicted in FIG. 6, a first skimming occurs between records 9901-10200 of dataset #100 of the area 600, as indicated by information extracted from CWI-4 headers. In this example, a first header (e.g., labeled "Dataset #100 Record #10,000") indicates that records 9,901-10,000 are present in dataset #100 of area 600, a second header (e.g., labeled "Dataset #101 Record #10,100") indicates that records 10,001-10,100 are present in dataset #101 of area 600, etc. In this example, the first skimming is not able to successfully locate the target record. After the first skimming, a second skimming is performed starting at record 10201. During the $2^{nd}$ skimming, the target record, "Record #10,350," is found in dataset #103. Thus, the $2^{nd}$ skimming ends and the reposition is complete at Record 10,350.

Figure 7:
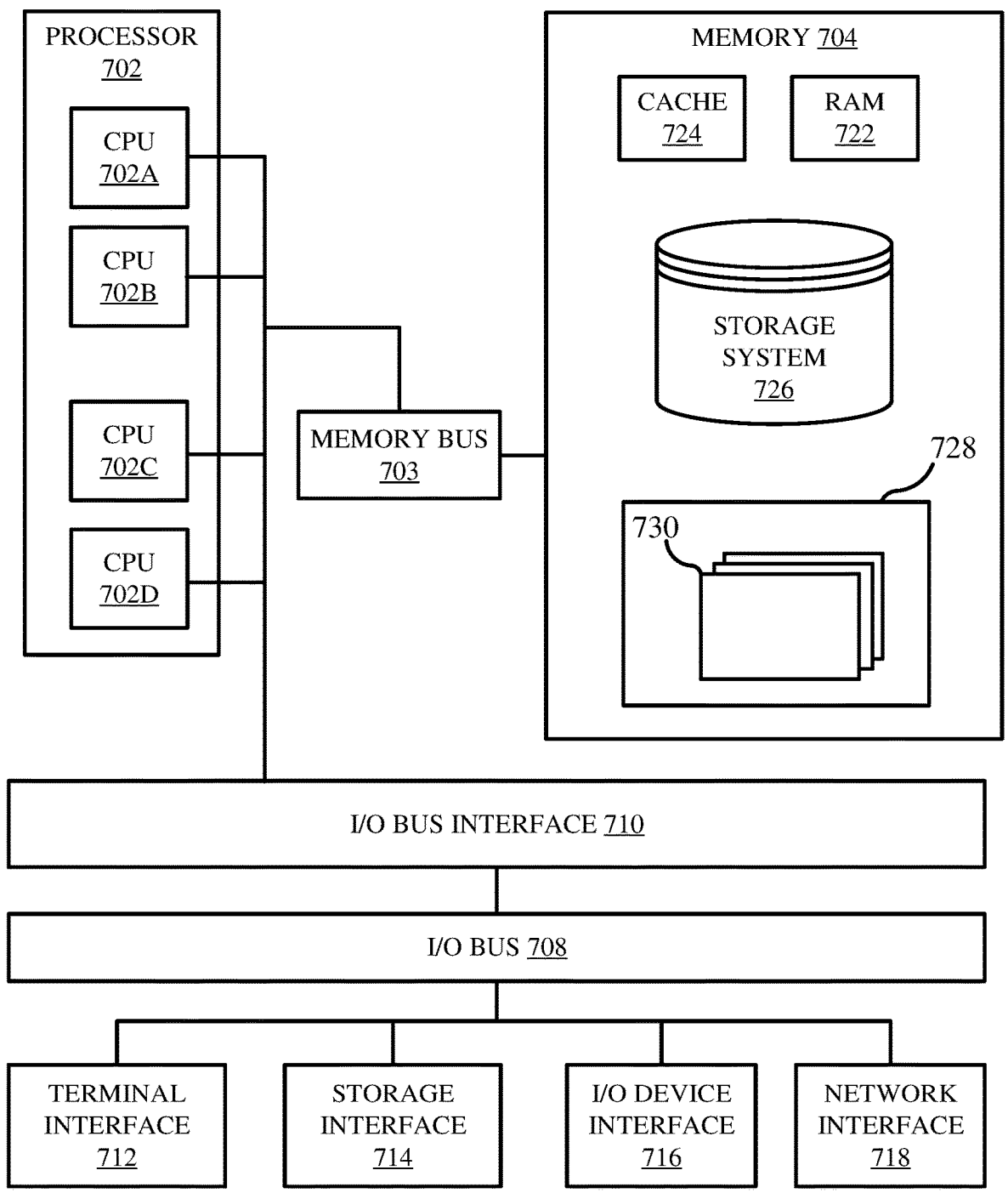
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., a host computer system communicatively coupled to a linear tape file system (LTFS)) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 701 can comprise one or more CPUs 702, a memory subsystem 704, a terminal interface 712, a storage interface 716, an I/O (Input/Output) device interface 714, and a network interface 718, all of which can be communicatively coupled, directly or indirectly, for inter-component communication via a memory bus 703, an I/O bus 708, and an I/O bus interface unit 710.

The computer system 701 can contain one or more general-purpose programmable central processing units (CPUs) 702A, 702B, 702C, and 702D, herein generically referred to as the CPU 702. In some embodiments, the computer system 701 can contain multiple processors typical of a relatively large system; however, in other embodiments the computer system 701 can alternatively be a single CPU system. Each CPU 702 can execute instructions stored in the memory subsystem 704 and can include one or more levels of on-board cache.

System memory 704 can include computer system readable media in the form of volatile memory, such as random access memory (RAM) 722 or cache memory 724. Computer system 701 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. In embodiments, memory 704 can include a magnetic tape system. For example, the computer system 701 may be communicatively coupled to a linear tape file system (LTFS). Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 701 can be a multi-user mainframe computer system, a single-user system, or a server computer or similar device that has little or no direct user interface, but receives requests from other computer systems (clients). Further, in some embodiments, the computer system 701 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components can have greater or lesser complexity than as represented in FIG. 7, components other than or in addition to those shown in FIG. 7 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of writing a dataset to a linear file tape system (LFTS) tape, the dataset including a plurality of sub datasets, each sub dataset including a plurality of headers and a plurality of records, the method comprising:
storing, in each header of each sub dataset, a record range indicator indicating a range of records included in the dataset, wherein record range indicators are used to locate target records based on received reposition requests.

2. The method of claim 1, wherein the method further comprises:
receiving a reposition request indicating a target record for repositioning;
referencing a tape directory to determine that a tape area includes the target record, the tape directory mapping physical areas on the tape to record number ranges;
skimming a predetermined length of the tape area to read each record range indicator stored in each header stored in each sub dataset within the tape area; and
identifying a dataset within the tape area that includes the target record based on the target record being included in a record number range stored in a header of the dataset.

3. The method of claim 2, further comprising:
receiving a second reposition request indicating a second target record for repositioning;
referencing the tape directory to determine that a second tape area includes the second target record;
skimming a full length of the second tape area to read each record range indicator stored in each header stored in each sub dataset within the second tape area; and
identifying a second dataset within the second tape area that includes the second target record based on the second target record being included in a second record number range stored in a second header of the second dataset.

4. The method of claim 2, wherein the predetermined length is based on a physical length of the tape.

5. The method of claim 2, wherein the predetermined length is based on a number of datasets within the tape area.

6. The method of claim 1, wherein the dataset is stored in a ring buffer with a plurality of other datasets.

7. The method of claim 1, wherein each header of each respective sub dataset further includes at least a portion of a file marker range indicator indicating a range of file markers included in the dataset.

8. A system comprising:
one or more processors; and
one or more computer-readable storage media collectively storing program instructions which, when executed by the one or more processors, are configured to cause the one or more processor to perform a method of writing a dataset to a linear file tape system (LFTS) tape, the dataset including a plurality of sub datasets, each sub dataset including a plurality of headers and a plurality of records, the method comprising:
storing, in each header of each sub dataset, a record range indicator indicating a range of records included in the dataset, wherein record range indicators are used to locate target records based on received reposition requests.

9. The system of claim 8, wherein the method performed by the one or more processors further comprises:
receiving a reposition request indicating a target record for repositioning;
referencing a tape directory to determine that a tape area includes the target record, the tape directory mapping physical areas on the tape to record number ranges;
skimming a predetermined length of the tape area to read each record range indicator stored in each header stored in each sub dataset within the tape area; and
identifying a dataset within the tape area that includes the target record based on the target record being included in a record number range stored in a header of the dataset.

10. The system of claim 9, wherein the method performed by the one or more processors further comprises:
receiving a second reposition request indicating a second target record for repositioning;
referencing the tape directory to determine that a second tape area includes the second target record;
skimming a full length of the second tape area to read each record range indicator stored in each header stored in each sub dataset within the second tape area; and
identifying a second dataset within the second tape area that includes the second target record based on the second target record being included in a second record number range stored in a second header of the second dataset.

11. The system of claim 9, wherein the predetermined length is based on a physical length of the tape.

12. The system of claim 9, wherein the predetermined length is based on a number of datasets within the tape area.

13. The system of claim 8, wherein the dataset is stored in a ring buffer with a plurality of other datasets.

14. The system of claim 8, wherein each header of each respective sub dataset further includes at least a portion of a file marker range indicator indicating a range of file markers included in the dataset.

15. A computer program product comprising one or more computer readable storage media, and program instructions collectively stored on the one or more computer readable storage media, the program instructions comprising instructions configured to cause one or more processors to perform a method of writing a dataset to a linear file tape system (LFTS) tape, the dataset including a plurality of sub datasets, each sub dataset including a plurality of headers and a plurality of records, the method comprising:
 storing, in each header of each sub dataset, a record range indicator indicating a range of records included in the dataset, wherein record range indicators are used to locate target records based on received reposition requests.

16. The computer program product of claim 15, wherein the method performed by the one or more processors further comprises:
 receiving a reposition request indicating a target record for repositioning;
 referencing a tape directory to determine that a tape area includes the target record, the tape directory mapping physical areas on the tape to record number ranges;
 skimming a predetermined length of the tape area to read each record range indicator stored in each header stored in each sub dataset within the tape area; and
 identifying a dataset within the tape area that includes the target record based on the target record being included in a record number range stored in a header of the dataset.

17. The computer program product of claim 16, wherein the method performed by the one or more processors further comprises:
 receiving a second reposition request indicating a second target record for repositioning;
 referencing the tape directory to determine that a second tape area includes the second target record;
 skimming a full length of the second tape area to read each record range indicator stored in each header stored in each sub dataset within the second tape area; and
 identifying a second dataset within the second tape area that includes the second target record based on the second target record being included in a second record number range stored in a second header of the second dataset.

18. The computer program product of claim 16, wherein the predetermined length is based on a physical length of the tape.

19. The computer program product of claim 15, wherein the dataset is stored in a ring buffer with a plurality of other datasets.

20. The computer program product of claim 15, wherein each header of each respective sub dataset further includes at least a portion of a file marker range indicator indicating a range of file markers included in the dataset.

\* \* \* \* \*